United States Patent

Wu et al.

(10) Patent No.: US 8,467,453 B2
(45) Date of Patent: Jun. 18, 2013

(54) MOTION VECTOR CALIBRATION CIRCUIT, IMAGE GENERATING APPARATUS AND METHOD THEREOF

(75) Inventors: Hung Wei Wu, Chung Ho (TW); Chih-Yu Chang, Hsin Chu (TW); Ming-Jen Tai, Tao Yuan (TW); Yu-Chieh Chen, Taipei (TW)

(73) Assignee: Silicon Integrated Systems Corp., Hsinchu (TW)

( * ) Notice: Subject to any disclaimer, the term of this patent is extended or adjusted under 35 U.S.C. 154(b) by 760 days.

(21) Appl. No.: 12/564,529

(22) Filed: Sep. 22, 2009

(65) Prior Publication Data

US 2010/0329343 A1  Dec. 30, 2010

(30) Foreign Application Priority Data

Jun. 29, 2009  (TW) ............................... 98121762 A

(51) Int. Cl.
*H04N 7/15* (2006.01)
(52) U.S. Cl.
USPC .................................... 375/240.16

(58) Field of Classification Search
USPC ............... 348/699, 700, 416.1, 571; 382/107, 382/236, 238; 375/240.16, 240.17
See application file for complete search history.

(56) References Cited

U.S. PATENT DOCUMENTS

| 5,111,511 | A * | 5/1992 | Ishii et al. ...................... 382/107 |
| 7,463,687 | B2 * | 12/2008 | Subramaniyan et al. 375/240.16 |
| 8,189,670 | B2 * | 5/2012 | Sasai et al. ............... 375/240.16 |
| 2005/0025243 | A1 * | 2/2005 | Sohn et al. ............... 375/240.16 |
| 2005/0249288 | A1 * | 11/2005 | Ha ............................ 375/240.16 |
| 2010/0266041 | A1 * | 10/2010 | Gish et al. ................ 375/240.15 |

* cited by examiner

*Primary Examiner* — Nhon Diep
(74) *Attorney, Agent, or Firm* — Muncy, Geissler, Olds & Lowe, PLLC

(57) ABSTRACT

A motion vector calibration circuit includes a select circuit, a local minimum detection circuit, a sine wave detection circuit, a threshold value detection circuit and a decision circuit. Correct motion vectors are passed using a recursive method, thereby achieving high accuracy and reducing computational volume.

21 Claims, 12 Drawing Sheets

N: non-periodic block
P: periodic block

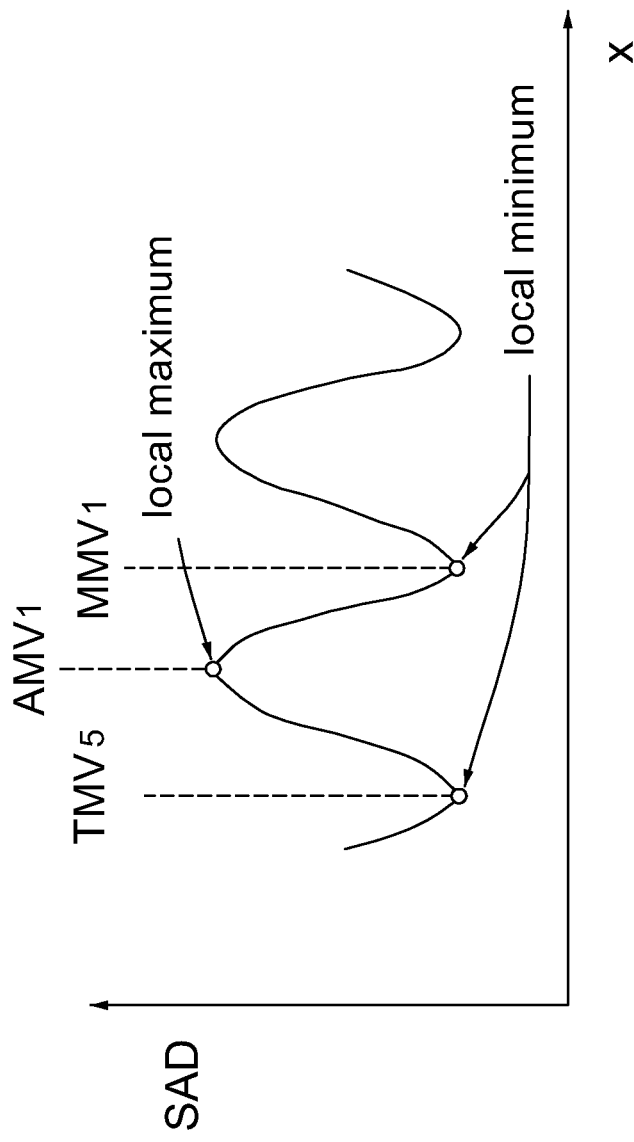

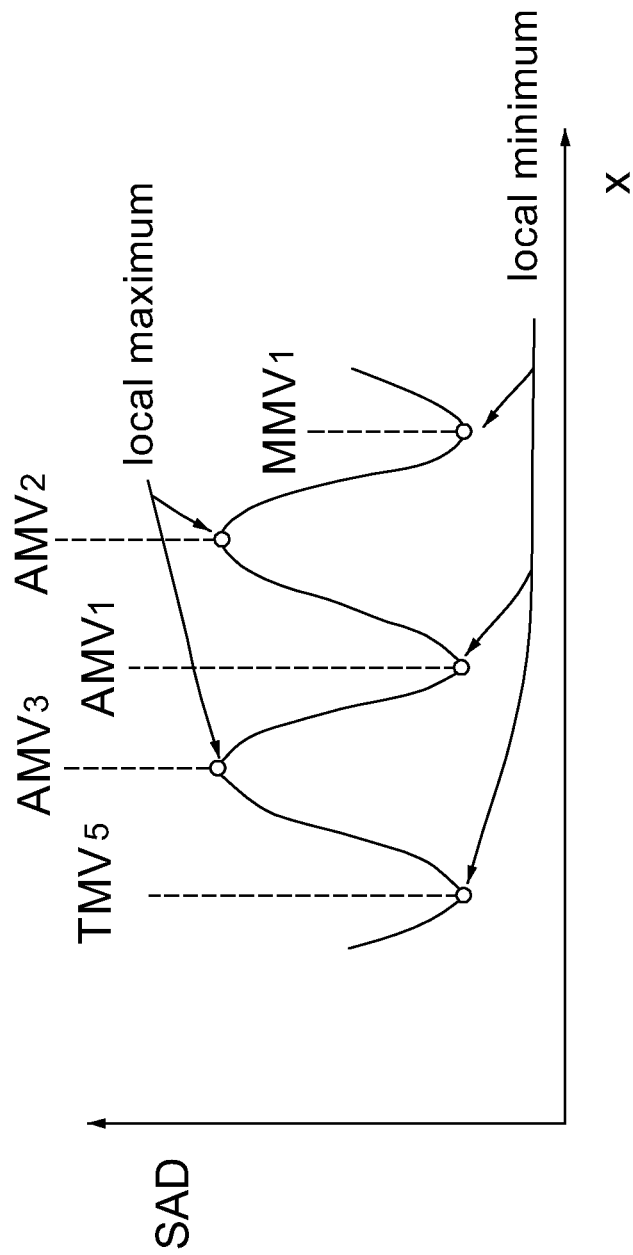

MOTION VECTOR CALIBRATION CIRCUIT, IMAGE GENERATING APPARATUS AND METHOD THEREOF

This application claims the benefit of the filing date of Taiwan Application Ser. No. 098121762, filed on Jun. 29, 2009, the content of which is incorporated herein by reference.

BACKGROUND OF THE INVENTION

1. Field of the Invention

The invention relates to frame rate up-conversion (FRUC) technique, and more particularly, to a circuit and method for calibrating motion vectors for periodic patterns.

2. Description of the Related Art

Frame rate up-conversion (FRUC) is the conversion process between any two display formats with different frame rates. FRUC has various applications, e.g., saving bandwidth in low bit-rate video transmission, reducing movies juddering in converting a 24 fps video source into a higher frame rate and reducing blurring effect in a hold-type liquid crystal display (LCD).

Most FRUC use motion estimation (ME) to obtain motion vectors of moving objects and then perform motion compensated interpolation (MCI) to interpolate images of the moving objects in different frames. Most ME methods calculate motion vectors with the minimum sums of absolute difference (SAD) according to block matching estimation (BME) algorithm. However, under certain circumstances, many ME methods are inclined to fall in the trap of the local minimum SAD value. That is, a motion vector with the local minimum SAD value is not necessarily the real motion vector of a moving object; furthermore, even a motion vector with the global minimum SAD value is not necessarily the real motion vector of the moving object.

Most video sources contain periodic patterns like windows of buildings, text strings and striped clothes, etc. FIG. 1 shows an example of a periodic pattern. Referring to FIG. 1, a feature of periodic patterns is that periodic patterns usually contain plural local minimum SAD value in its SAD map. Thus, even though a motion vector MV1 with the global minimum SAD value is found according to the conventional MBE algorithm, the motion vector MV1 is not necessarily the real motion vector of the periodic pattern. FRUC is proposed to obtain better image quality. However, wrong motion vectors will degrade interpolated images and make it uncomfortable for watching experience.

SUMMARY OF THE INVENTION

In view of the above-mentioned problems, an object of the invention is to provide a motion vector calibration circuit which uses a recursive method to pass a correct motion vector from a boundary of an object with a periodic pattern to another boundary of the object, thereby increasing accuracy and efficiency and reducing computational volume and cost.

To achieve the above-mentioned object, the motion vector calibration circuit according to the invention is used to receive a temporary motion vector of a target block of an image and a plurality of motion estimation errors of the target block and generate a calibrated motion vector of the target block. The motion vector calibration circuit comprises: a select circuit for selecting a candidate motion vector according to coordinates of the target block; a first detection circuit for detecting whether the motion estimation error corresponding to the candidate motion vector is a local minimum according to the candidate motion vector, the plurality of motion estimation errors and a preset vector; a second detection circuit for selecting at least three sampled motion vectors to detect whether the motion estimation errors corresponding to the at least three sampled motion vectors form a sine wave according to the candidate motion vector and the temporary motion vector; a third detection circuit for detecting whether the motion estimation error corresponding to the candidate motion vector is less than a threshold value according to the candidate motion vector; and, a decision circuit for outputting the candidate motion vector as the calibrated motion vector if detecting results of the first checking circuit, the second detection circuit and the third detection circuit are positive.

Another objective of the invention is to provide an image generating apparatus for receiving a first image and a second image to generate at least one interpolated image, comprising: a vector estimation circuit for performing vector estimation and generating both a temporary motion vector and a plurality of motion estimation errors of a target block according to the target block of the first image and a preset search area established in the second image, wherein the first image and the second image are respectively divided into the same number of blocks and the temporary motion vector has the minimum motion estimation error; a motion vector calibration circuit for receiving both the temporary motion vector and the plurality of motion estimation errors of the target block and generating a calibrated motion vector of the target block, comprising: a select circuit for selecting a candidate motion vector according to coordinates of the target block; a first detection circuit for detecting whether the motion estimation error corresponding to the candidate motion vector is a local minimum according to the candidate motion vector, the plurality of motion estimation errors and a preset vector; a second detection circuit for selecting at least three sampled motion vectors to detect whether the motion estimation errors corresponding to the at least three sampled motion vectors form a sine wave according to the candidate motion vector and the temporary motion vector; a third detection circuit for detecting whether the motion estimation error corresponding to the candidate motion vector is less than a threshold value according to the candidate motion vector; and, a decision circuit for outputting the candidate motion vector as the calibrated motion vector if detecting results of the first checking circuit, the second detection circuit and the third detection circuit are positive; and, a motion compensated interpolation circuit for performing image interpolation to generate the at least one interpolated image according to all the calibrated motion vectors of the first image, the first image and the second image.

Another objective of the invention is to provide a motion vector calibration method for receiving a temporary motion vector of a target block of an image and a plurality of motion estimation errors of the target block and generating a calibrated motion vector of the target block, comprising: selecting a candidate motion vector according to coordinates of the target block; detecting whether the motion estimation error corresponding to the candidate motion vector is a local minimum according to the candidate motion vector, the plurality of motion estimation errors and a preset vector; selecting at least three sampled motion vectors to detect whether the motion estimation errors corresponding to the at least three sampled motion vectors form a sine wave according to the candidate motion vector and the temporary motion vector; detecting whether the motion estimation error corresponding to the candidate motion vector is less than a threshold value according to the candidate motion vector; and, setting the calibrated motion vector to the temporary motion vector if the three detecting results are positive.

Another objective of the invention is to provide an image generating method for receiving a first image and a second image to generate at least one interpolated image, comprising: performing vector estimation to generate both a temporary motion vector and a plurality of motion estimation errors of a target block according to the target block of the first image and a preset search area established in the second image, wherein the first image and the second image are respectively divided into the same number of blocks and the temporary motion vector has the minimum motion estimation error; selecting a candidate motion vector according to coordinates of the target block; detecting whether the motion estimation error corresponding to the candidate motion vector is a local minimum according to the candidate motion vector, the plurality of motion estimation errors and a preset vector; selecting at least three sampled motion vectors to detect whether the motion estimation errors corresponding to the at least three sampled motion vectors form a sine wave according to the candidate motion vector and the temporary motion vector; detecting whether the motion estimation error corresponding to the candidate motion vector is less than a threshold value according to the candidate motion vector; setting the calibrated motion vector to the temporary motion vector if the three detecting results are positive; and, performing image interpolation to generate the at least one interpolated image according to all the calibrated motion vectors of the first image, the first image and the second image.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6A shows an example of the SAD map forming a sine wave.

FIG. 6B shows another example of the SAD map forming a sine wave.

DETAILED DESCRIPTION OF THE INVENTION

In the present disclosure, numerous specific details are provided, such as examples of electrical circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

A feature of the invention is to pass a correct motion vector of a non-periodic pattern to all the periodic blocks having a periodic pattern by using a recursive method, thus achieving high accuracy and reducing computational volume. The input images of the image generating apparatus of the invention can either be frames or fields, and the following embodiments are all described referring to frames.

Figure 1:
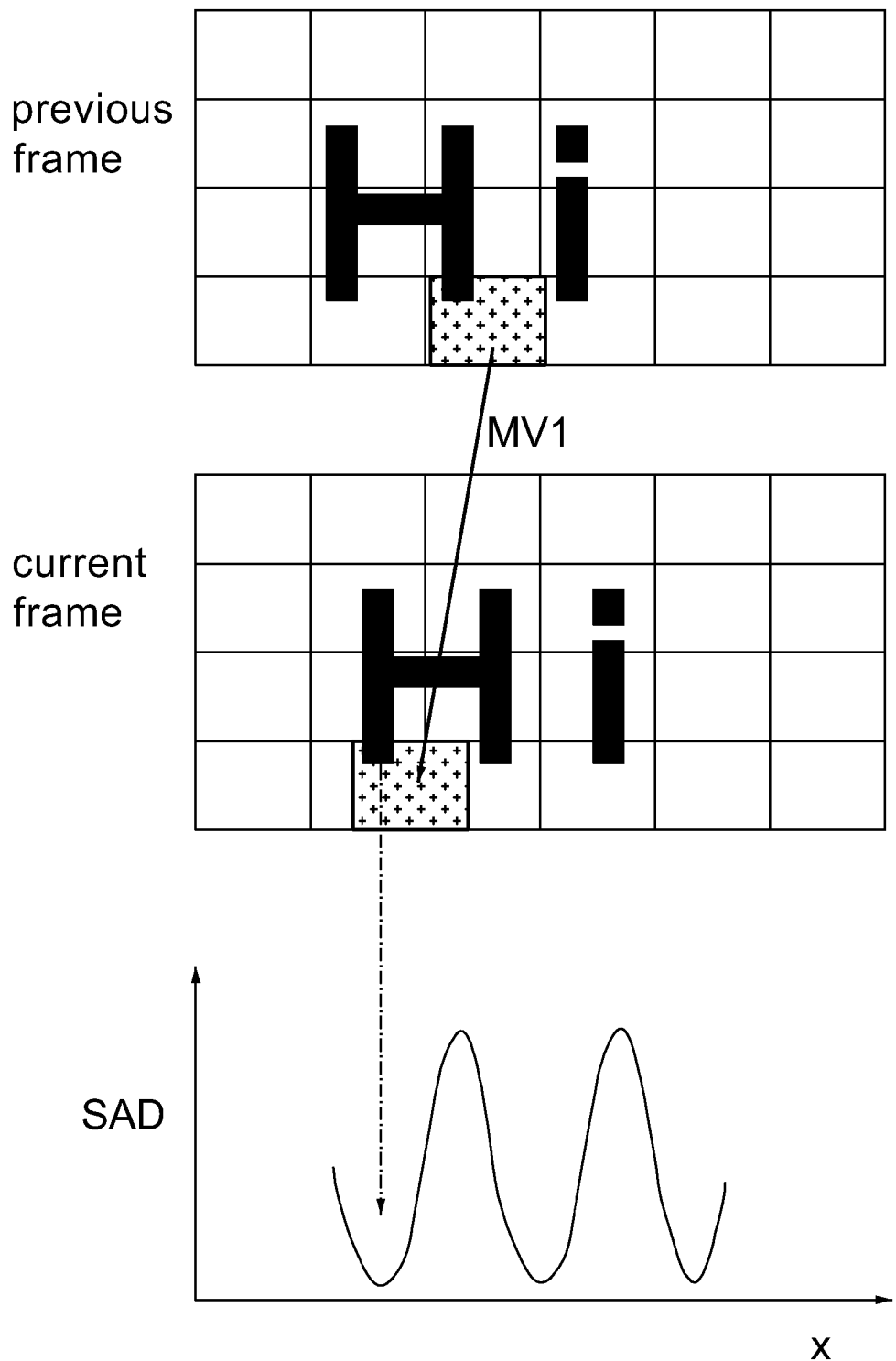
FIG. 1 shows an example of a periodic pattern.
Figure 2:
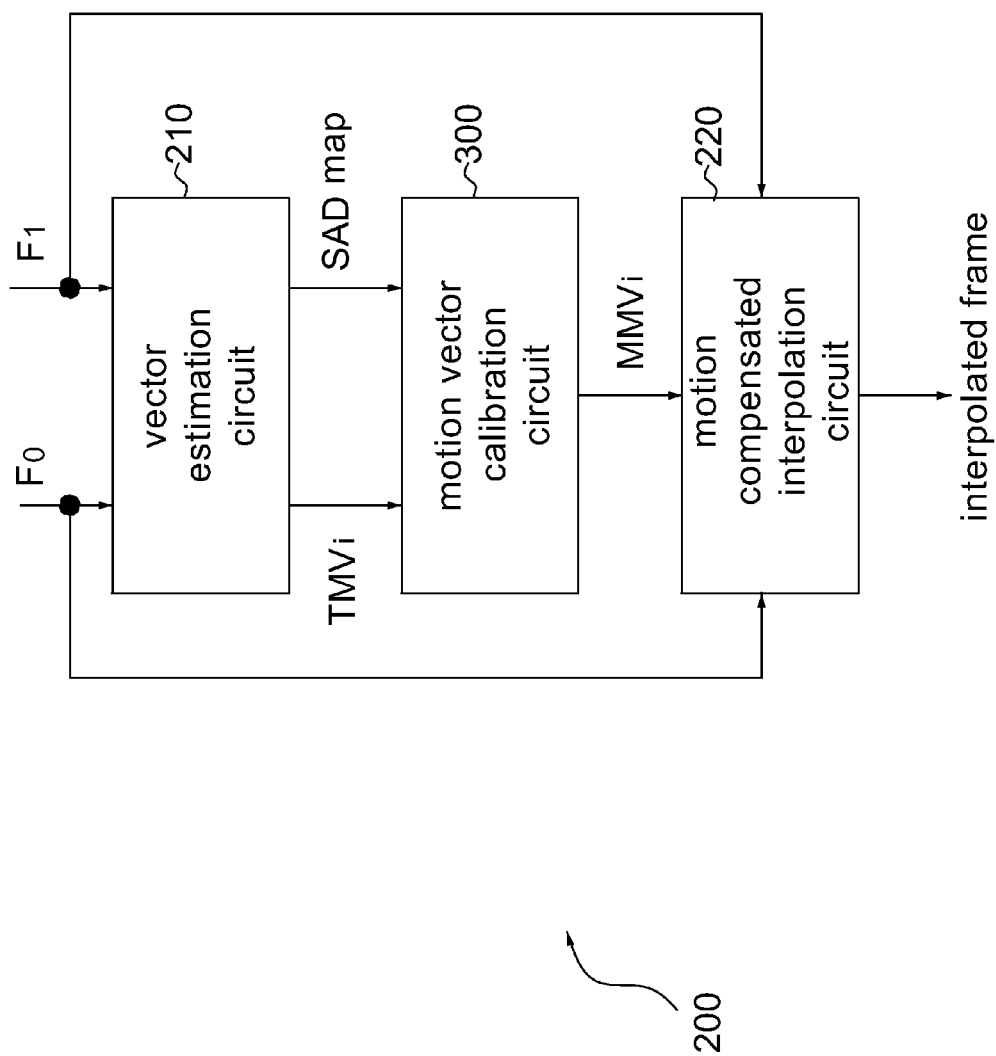
FIG. 2 is a block diagram showing an image generating apparatus according to an embodiment of the invention.

FIG. 2 is a block diagram showing an image generating apparatus according to an embodiment of the invention. Referring to FIG. 2, an image generating apparatus 200 of the invention includes a vector estimation circuit 210, a motion vector calibration circuit 300 and a motion compensated interpolation circuit 220. After receiving a current frame F1 and a previous frame F0, the vector estimation circuit 210 divides the current frame F1 and the previous frame F0 respectively into the same number of blocks, and then compares one target block Bi of the current frame F1 with a preset search area established in the previous frame F0 to obtain a plurality of ME errors. Next, the vector estimation circuit 210 compares these ME errors to obtain a temporary motion vector $TMV_i$ and a plurality of ME errors corresponding to the target block Bi. Here, the temporary motion vector $TMV_i$ of the target block Bi is a motion vector with the minimum ME error.

The above-mentioned ME errors can be estimated by use of Sum of Absolute Difference (SAD), Mean Absolute Difference (MAD), Mean Square Error (MSE), or all the known approaches that can estimate motion vectors. The embodiments of the invention apply the SAD values, so the ME errors are referred to as the "SAD values". Accordingly, the SAD values calculated by the vector estimation circuit 210 form a SAD map, and the size of the SAD map is identical to the preset search area mentioned above. The vector estimation circuit 210 transmits the temporary motion vector $TMV_i$ and the corresponding SAD map of the target block Bi to the motion vector calibration circuit 300. Here, the temporary motion vector $TMV_i$ of the target block Bi is the motion vector having the minimum SAD value.

After receiving the temporary motion vector $TMV_i$ and the corresponding SAD map of the target block Bi, the motion vector calibration circuit 300 starts to perform motion vector calibration to generate the calibrated motion vector $MMV_i$ of the target block Bi. The operations of the motion vector calibration circuit 300 will be described in further detail below. After receiving the calibrated motion vectors $MMV_i$ of all the blocks of the current frame F1 in sequence, the motion compensated interpolation circuit 220 performs image interpolation according to the current frame F1 and the previous frame F0 to generate at least one interpolated frame.

Figure 3:
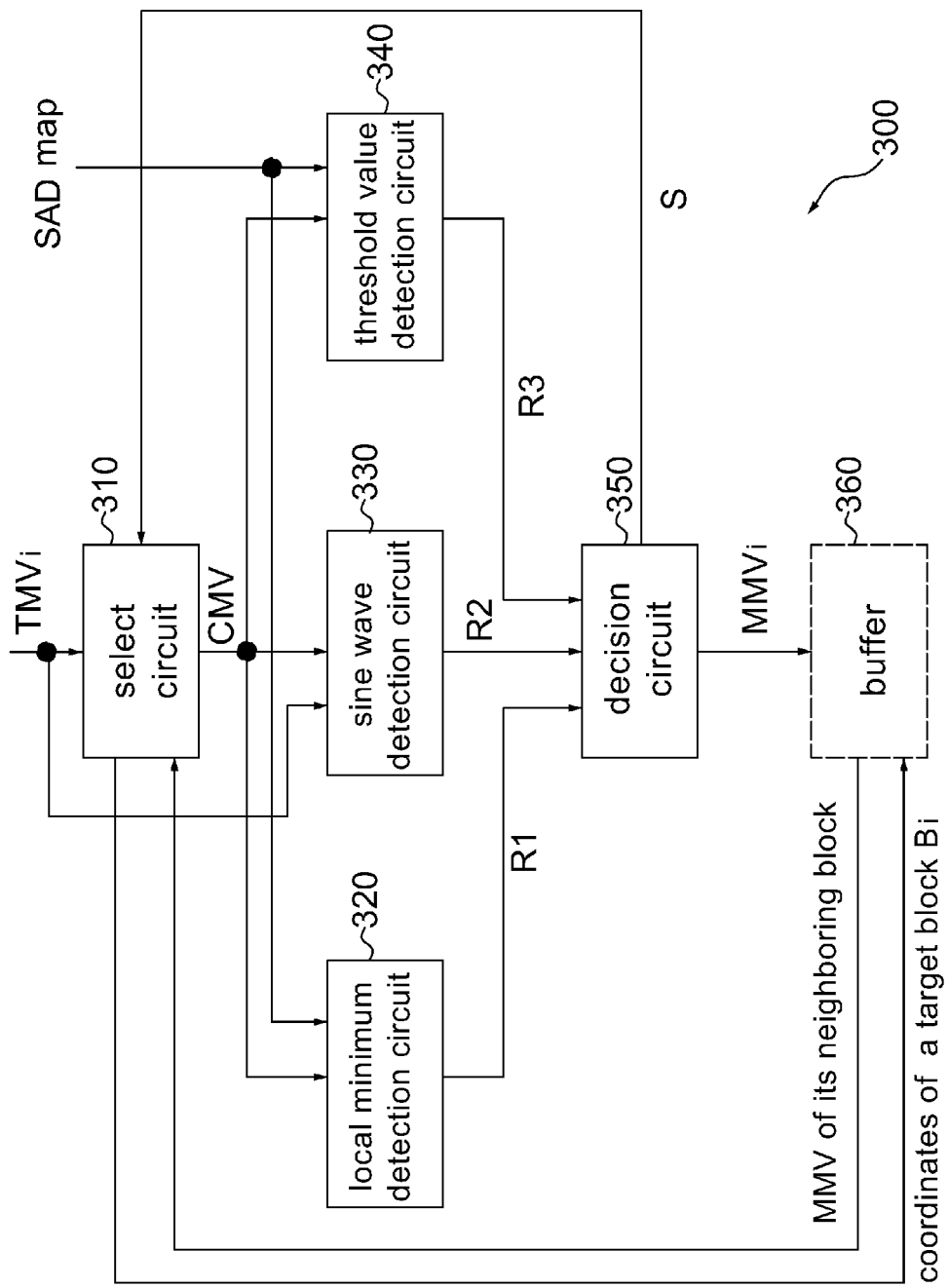
FIG. 3 is a block diagram showing a motion vector calibration circuit according to an embodiment of the invention.

FIG. 3 is a block diagram showing a motion vector calibration circuit 300 according to an embodiment of the invention. Referring to FIG. 3, a motion vector calibration circuit 300 of the invention includes a select circuit 310, a local minimum detection circuit 320, a sine wave detection circuit 330, a threshold value detection circuit 340, a decision circuit 350 and a buffer 360. After receiving the temporary motion vector $TMV_i$ of the target block Bi, the select circuit 310 transmits the coordinates of the target block Bi to the buffer 360 in order to obtain the calibrated motion vector MMV of at least one preset neighboring block and then selects at least one motion vector from the calibrated motion vector MMV and the global motion vector GMV to sequentially serve as a candidate motion vector CMV. Following this, the candidate motion vector CMV is transmitted to the local minimum detection circuit 320, the sine wave detection circuit 330 and the threshold value detection circuit 340 for periodic pattern detection.

Figure 4A:
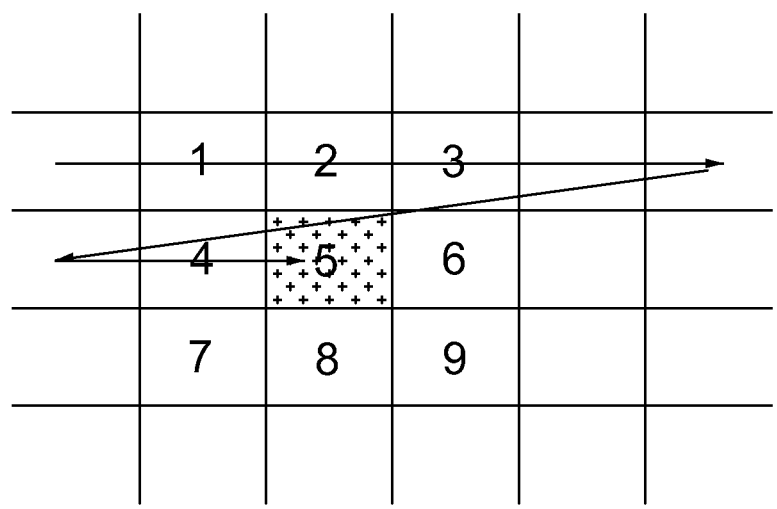
FIG. 4A shows a motion vector calibration sequence performed over a current frame F1.

By way of example but not limitation, FIG. 4A shows a motion vector calibration sequence performed over a current frame F1. Referring to FIG. 4A, assuming that the target block is $B_5$ (i.e., i=5, the grey block), the motion vector calibration sequence performed by the motion vector calibration circuit 300 is indicated by the arrows, i.e., from the top to the bottom and from the left to the right. The motion vector calibration sequence shows that the motion vector calibration circuit 300 has already completed the calibrations of the motion vectors of the neighboring blocks $B_1$, $B_2$, $B_3$ and $B_4$ before starting to calibrate the motion vector of the target block $B_5$. In one embodiment, the select circuit 310 selects the calibrated motion vectors MV $MMV_1$, $MMV_2$, $MMV_3$ and $MMV_4$ of the blocks $B_1$, $B_2$, $B_3$ and $B_4$ and the global motion vector GMV of the current frame F1 to sequentially serve as the candidate motion vector CMV of the target block $B_5$. In an alternative embodiment, the select circuit 310 only selects the calibrated motion vector $MMV_4$ of the block $B_4$ and the global MV GMV of the current frame F1 to sequentially serve as the candidate motion vector CMV of the target block $B_5$ for saving hardware cost and operation time.

Assuming that the select circuit 310 selects the above-mentioned calibrated motion vector $MMV_1$, $MMV_2$, $MMV_3$ and $MMV_4$ and the global motion vector GMV to sequentially serve as the candidate motion vector CMV of the target block $B_5$ and the calibrated motion vector $MMV_1$ is selected as the first candidate motion vector CMV of the target block $B_5$, the first candidate motion vector $MMV_1$ is transmitted to the local minimum detection circuit 320, the sine wave detection circuit 330 and the threshold value detection circuit 340 for periodic pattern detection. The operations will be described in detail herein.

Figure 5:
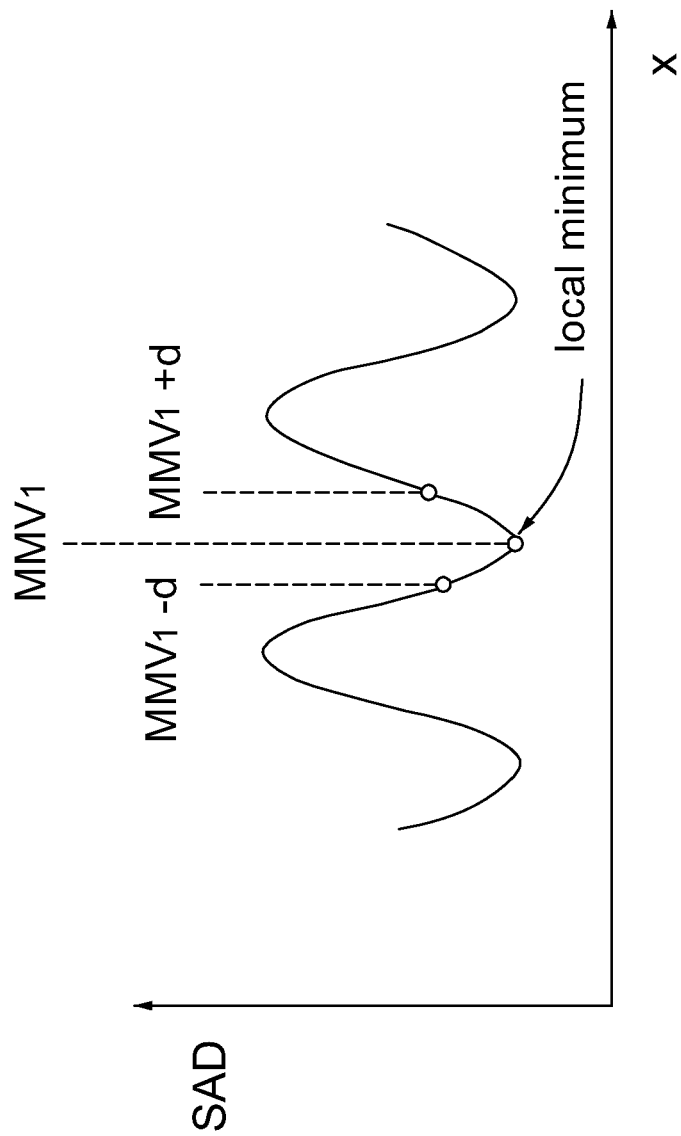
FIG. 5 shows an example of a local minimum value in a SAD map.

The local minimum detection circuit 320 receives the first candidate motion vector $MMV_1$ of the target block $B_5$ from the select circuit 310 and the corresponding SAD map of the target block $B_5$ from the vector estimation circuit 210, and detects whether the corresponding SAD value of the candidate motion vector $MMV_1$ is a local minimum value according to a preset vector d(x,y) to generate a result signal R1 (assuming that it is positive (the SAD value is a local minimum value) while the result signal R1 is enabled and it is negative while the result signal R1 is disabled). FIG. 5 shows an example of a local minimum value in a SAD map. It should be noted that the SAD map is a function of x and y. For an explicit explanation, each of FIG. 5 and FIG. 6A merely shows the relation between the SAD map and x axis. Referring to FIG. 5, assuming that x=2 and y=0 in the preset vector d(x,y), the relations $SAD(MMV_1-d)>SAD(MMV_1)$ and $SAD(MMV_1+d)>SAD(MMV_1)$ denote the corresponding SAD value of the first candidate motion vector $MMV_1$ is a local minimum value. Here, the value of the preset vector d(x,y) is adjustable.

After receiving the first candidate motion vector $MMV_1$ of the target block $B_5$ and the temporary motion vector $TMV_5$, the sine wave detection circuit 330 selects at least three motion vectors to detect whether their corresponding SAD values form a sine wave and thus generates a result signal R2 (assuming that it is positive (their corresponding SAD values form a sine wave) while the result signal R2 is enabled and it is negative while the result signal R2 is disabled). FIG. 6A shows an example of the SAD map forming a sine wave. In an embodiment, the sine wave detection circuit 330 selects the candidate motion vector $MMV_1$, the temporary motion vector $TMV_5$ of the target block $B_5$ and the average motion vector $AMV1(=½(TMV_5+MMV_1))$ of these two vectors to detect whether the corresponding SAD values of the target block $B_5$ forms a sine wave. Referring to FIG. 6A, the relations $SAD(AMV_1)>SAD(TMV_5)+delta$ and $SAD(AMV_1)>SAD(MMV_1)+delta$ denote the values $SAD(TMV_5)$, $SAD(AMV_1)$ and $SAD(MMV_1)$ show a Low-High-Low trend, i.e. the periodic form of a sine wave. Here, the delta value is a preset difference value and adjustable to ensure that a distance between the peak and the trough of a sine wave is large enough. In the example of FIG. 6A, the sine wave detection circuit 330 samples three motion vectors to detect if the SAD map forms a sine wave. In practical applications, three sampled motion vectors are enough for most SAD maps to ensure whether their corresponding SAD maps form a sine wave, but there is an exception as shown in FIG. 6B. Referring to FIG. 6B, the SAD values of the motion vectors $MMV_1$ and $TMV_5$ are both in the troughs and at a distance of an even number of sine waves, making the SAD value of the motion vector $AMV_1$ $(=½(TMV_5+MMV_1))$ in the trough and thus causing the sine wave detection circuit 330 to make a wrong decision. In order to avoid the above-mentioned problem, the sine wave detection circuit 330 can sample more than three motion vectors. As the example shown in FIG. 6B, the sine wave detection circuit 330 can ensure that the SAD map forms a sine wave by sampling two more motion vectors ($AMV_2$ and $AMV_3$). Here, the motion vector $AMV_2$ is the average motion vector of $AMV_1$ and $MMV_1$, i.e. $AMV_2=½(AMV_1+MMV_1)$. Likewise, $AMV_3$ is the average motion vector of $AMV_1$ and $TMV_5$, i.e. $AMV_3=½(AMV_1+TMV_5)$. As for the number of the motion vectors sampled by the sine wave detection circuit 330, there is a trade-off between hardware cost and accuracy. Basically, the more the sampled motion vectors, the more accurate the decision as to whether the SAD map form a sine wave, but hardware cost will become higher and the processing time will become longer.

After receiving the first candidate motion vector $MMV_1$ from the select circuit 310, the threshold value detection circuit 340 detects whether the corresponding SAD value of the candidate motion vector $MMV_1$ is smaller than a threshold value to generate a result signal R3 (assuming that it is positive (the corresponding SAD value is smaller than the threshold value) while the result signal R3 is enabled and it is negative while the result signal R3 is disabled). According to the embodiment in FIG. 4A, since the select circuit 310 has five candidate motion vectors ($MMV_1$, $MMV_2$, $MMV_3$, $MMV_4$ and GMV) in total, the decision circuit 350 sets a count value N whose initial value is five. Each time the decision circuit 350 makes a decision, the count value N will be decreased by one.

When the result signals R1, R2 and R3 of the local minimum detection circuit 320, the sine wave detection circuit 330 and threshold value detection circuit 340 are enabled (i.e. the detecting results are all positive), it means that $MMV_1$ passes periodic pattern detection. Then, the decision circuit 350 sets the calibrated motion vector $MMV_5$ of the target block $B_5$ to the candidate motion vector $MMV_1$, resets the count value N to five and finally delivers a control signal S (set to the $1^{st}$ state) to inform the select circuit 310 to select the candidate motion vectors for the next target block $B_6$. Otherwise, if any one signal of R1, R2 and R3 is disabled (i.e. at least one checking result is negative), it means that $MMV_1$ fails in periodic pattern detection and the count value N will be decreased by one. In the case of the count value N not equal to zero, the decision circuit 350 will immediately deliver a control signal S (set to the $2^{nd}$ state) to the select circuit 310. According to the embodiment in FIG. 4A, the select circuit 310 selects the next calibrated motion vector $MMV_2$ as the second candidate motion vector right after receiving the signal S at the $2^{nd}$ state, and then transmits the second candidate motion vector $MMV_2$ to the local minimum detection circuit 320, the sine wave detection circuit 330 and the threshold value detection circuit 340 for the next periodic pattern detection. The whole process is repeated until one of $MMV_1$, $MMV_2$, $MMV_3$, $MMV_4$ and GMV passes periodic pattern detection. As for the embodiment in FIG. 4A, the worst case is that all the above-mentioned five candidate motion vectors can not pass periodic pattern detection. In that case, the count value N will be equal to zero and the decision circuit 350 has to set the calibrated motion vector $MMV_5$ of the block $B_5$ to the temporary motion vector $TMV_5$ of the block $B_5$. Finally, the decision circuit 350 will store the generated calibrated motion vectors in sequence in the buffer 360. It should be noted that the buffer 360 might be integrated into the motion compensated interpolation circuit 220 of the next stage depending on different circuit design and requirements. Therefore, in term of the motion vector calibration circuit 300 of the invention, the buffer 360 is optional and thus is shown by dotted lines in FIG. 3.

Figure 7:
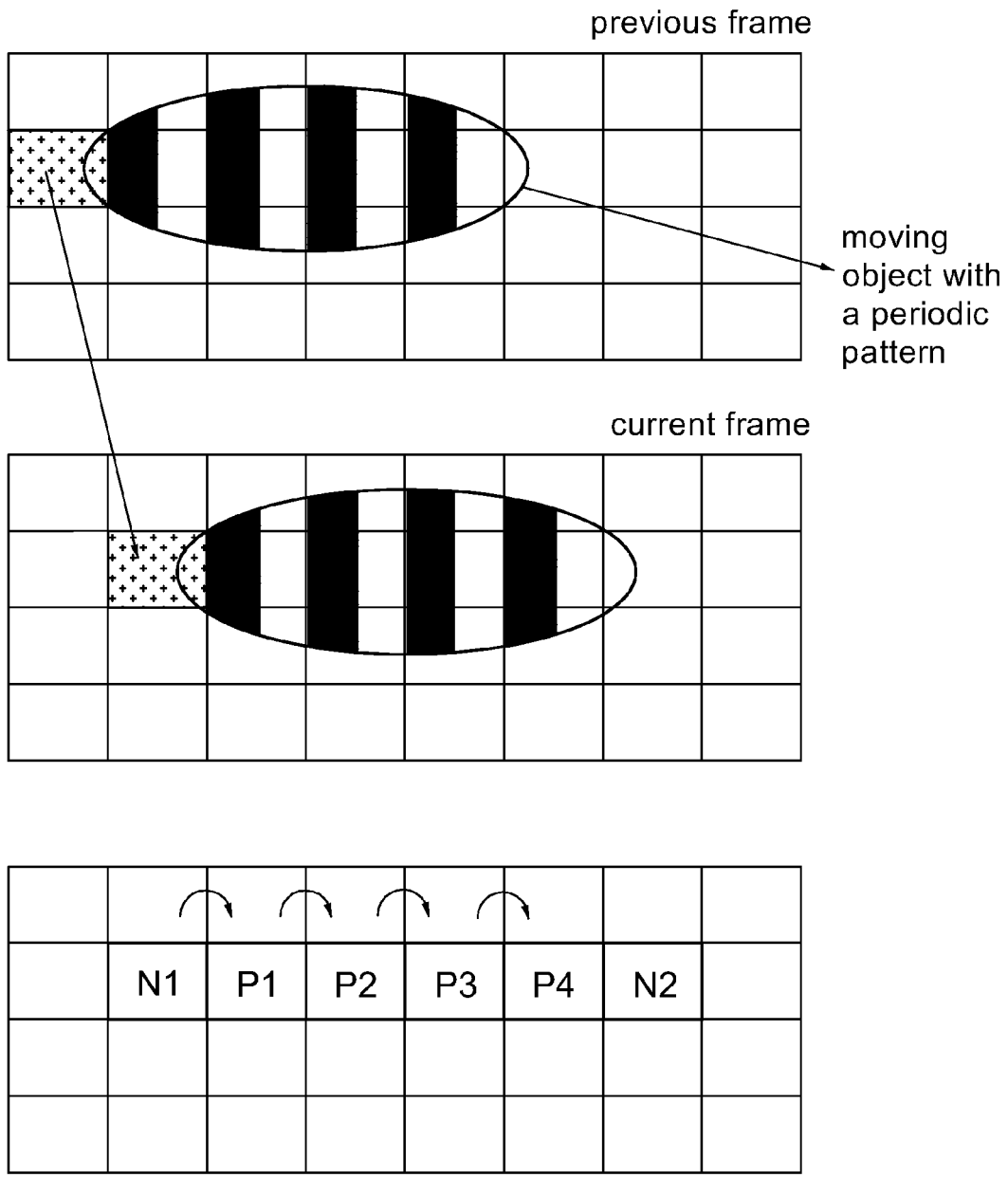
FIG. 7 shows an example of a moving object with periodic patterns.

FIG. 7 shows an example of a moving object with periodic patterns. Referring to FIG. 7, since the boundary of the moving object is not periodic, it is easy to figure out the correct motion vectors of the boundary of the moving object according to conventional MBE algorithm. Based on the motion vector calibration sequence shown in FIG. 4A, i.e. from the top to the bottom and from the left to the right, in view of the fact the motion vectors of neighboring blocks are close to each other, the correct motion vector of a neighboring non-periodic block $N_1$ is taken as a candidate motion vector of the periodic block $P_1$ for the above-mentioned periodic pattern detection. Once the candidate motion vector passes above-mentioned periodic pattern detection, it means the motion vector of the non-periodic block $N_1$ is substantially equal to the motion vector of the periodic block $P_1$. Therefore, as shown by the arrows at the bottom of FIG. 7, the motion vector calibration process of the moving object seems recursive. That is, the correct motion vector of the non-periodic block $N_1$ is passed to the periodic block $P_1$, then from the periodic block $P_1$ to the periodic block $P_2$, then from the periodic block $P_2$ to the periodic block $P_3$, and finally from the periodic block $P_3$ to the periodic block $P_4$. Following this, since the boundary block $N_2$ is also non-periodic and its motion vector is correct, the motion vector passing is terminated. By using the above-mentioned recursive method, the invention passes a correct motion vector from a boundary of an object to either another boundary of the object or a boundary of another object, thus reducing computational volume and increasing accuracy and efficiency. Further, research cost and hardware cost are also reduced.

Figure 8:
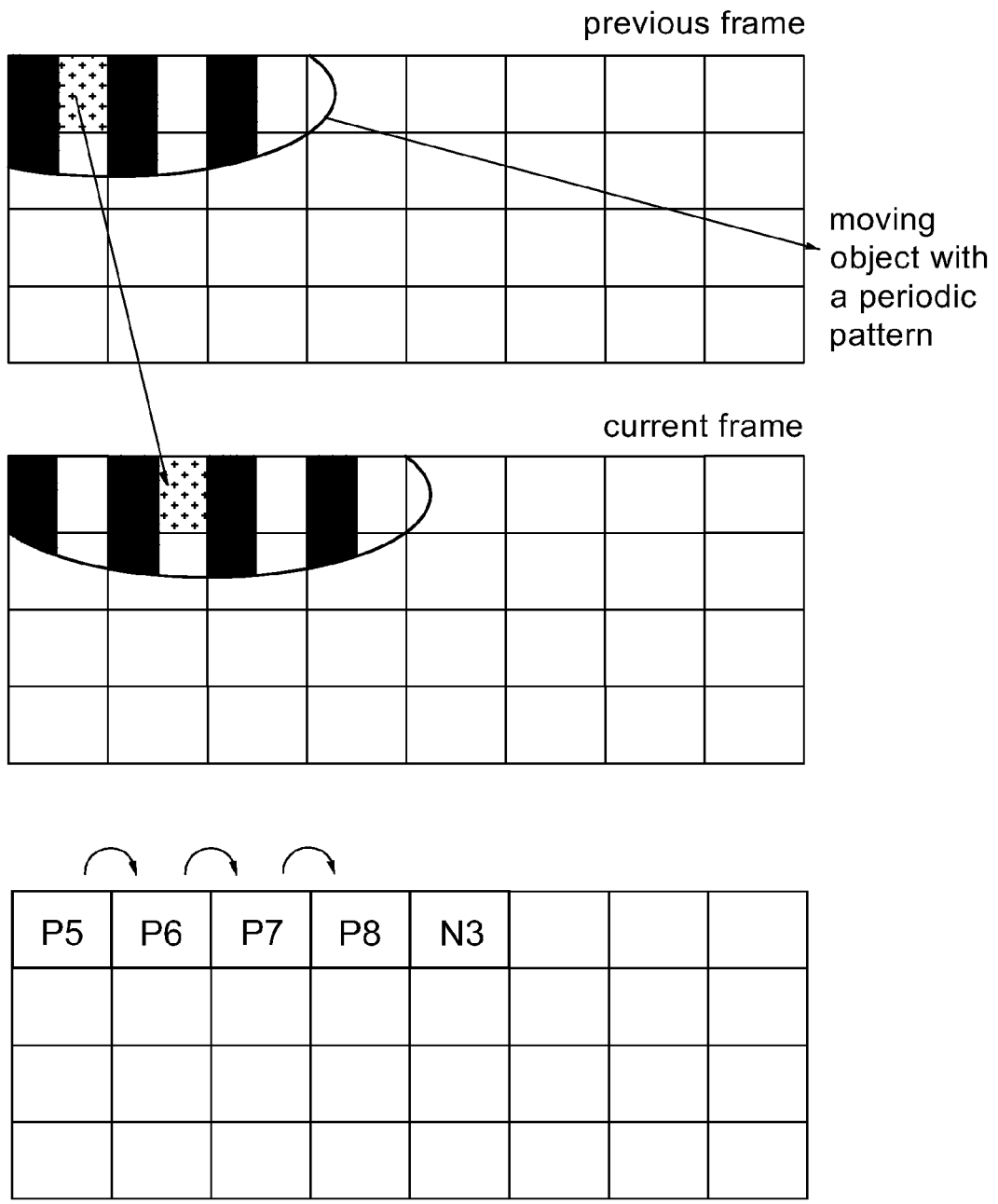
FIG. 8 shows another example of a moving object with periodic patterns.

FIG. 8 shows another example of a moving object with periodic patterns. In the case of a moving object with periodic patterns positioned at the boundary of two frames F0 and F1.

As shown in FIG. 8, since the periodic block $P_5$ is the first block to be performed the motion vector calibration, no motion vector of a non-periodic pattern will be passed to the periodic block $P_5$ for reference. At this moment, a global motion vector GMV is selected as a candidate motion vector of the periodic block $P_5$ for the above-mentioned periodic pattern detection. Once the global motion vector GMV passes the above-mentioned periodic pattern detection, it means the motion vector of the periodic block $P_5$ is substantially equal to the global motion vector GMV. Here, the global motion vector GMV is related to degrees of rotation, zoom-in, zoom-out or panning of the current frame F1. In practical applications, the statistic data of the panning vectors of the previous frame F0 serve as the global motion vector GMV in term of cost. For example, assuming that eight percent of blocks have motion vectors equal to "3" and fifty-three percent of blocks have motion vectors equal to "10", since the percentage of motion vector "10" is the largest one and greater than a threshold value (e.g., 20%), the global motion vector GMV of the current frame F1 will be set to "10".

Figure 9:
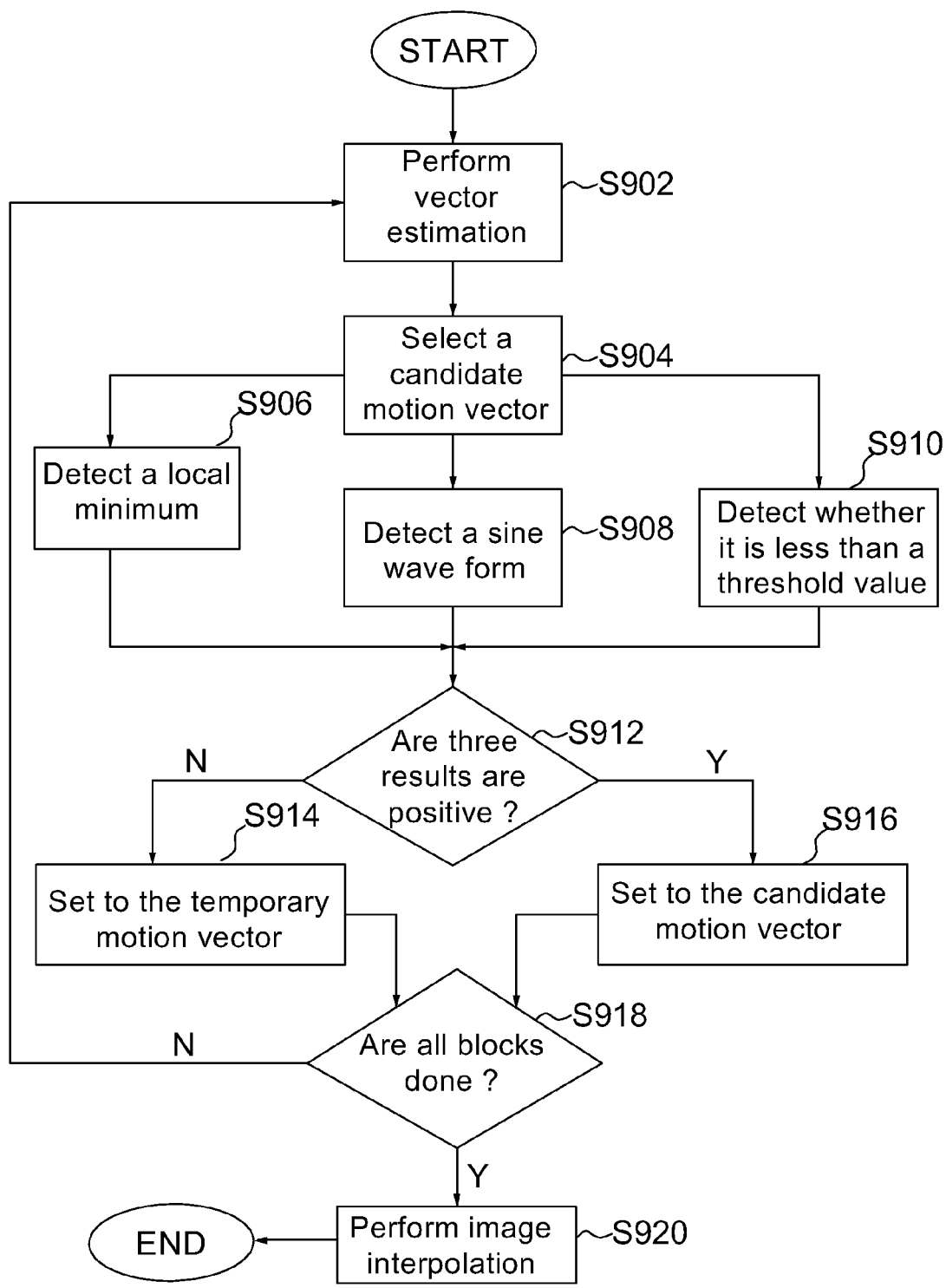
FIG. 9 is a flow chart showing an image generating method according to an embodiment of the invention.

FIG. 9 is a flow chart showing an image generating method according to an embodiment of the invention. According to an embodiment of the invention, an image generating method is used to receive a current frame F1 and a previous frame F0 to generate at least one interpolated frame. Referring to both FIG. 2 and FIG. 9, the image generating method is detailed as follows.

Step S902: Perform vector estimation. According to a target block $B_i$ of the current frame F1 and a preset search area established in the previous frame F0, vector estimation is performed to generate the temporary motion vector $TMV_i$ and the corresponding SAD map of the target block $B_i$. Here, the current frame F1 and the previous frame F0 are respectively divided into the same number of blocks and the temporary motion vector $TMV_i$ of the target block $B_i$ has the minimum SAD value.

Step S904: Select a candidate motion vector CMV according to coordinates of the target block $B_i$. In this embodiment, assuming that the motion vector calibration sequence is performed from the top to the bottom and from the left to the right in the current frame F1, the select circuit 310 only selects the calibrated motion vector of the neighboring block on the left side of the target block $B_i$ as the candidate motion vector CMV of the target block $B_i$.

Step 906: Detect whether the corresponding SAD value of the candidate motion vector CMV is a local minimum according to the candidate motion vector CMV, the SAD map and a preset vector d(x,y).

Step 908: Select at least three sampled motion vectors to detect whether the corresponding SAD values of the sampled motion vectors form a sine wave according to the candidate motion vector CMV and the temporary motion vector $TMV_i$.

Step S910: Detect whether the corresponding SAD value of the candidate motion vector CMV is less than a threshold value.

Step S912: Determine whether the detecting results of the step S906, S908 and S910 are all positive. Three positive detecting results mean the candidate motion vector CMV passes periodic pattern detection, and then the flow goes to Step S916. If any one of the detecting results of the step S906, S908 and S910 is negative, it means the candidate motion vector CMV fails in periodic pattern detection, and then the flow goes to step S914.

Step S914: Set the calibrated motion vector $MMV_i$ of the target block $B_i$ to the temporary motion vector $TMV_i$.

Step S916: Set the calibrated motion vector $MMV_i$ of the target block $B_i$ to the candidate motion vector CMV.

Step S918: Determine whether the motion vectors of all the blocks of the current frame F1 have been calibrated. If "YES", the flow jumps to step S920; otherwise, the flow returns to step 902.

Step 920: Perform image interpolation to generate at least one interpolated frame according to all calibrated motion vectors of the current frame F1, the current frame F1 and the previous frame F0.

Figure 10:
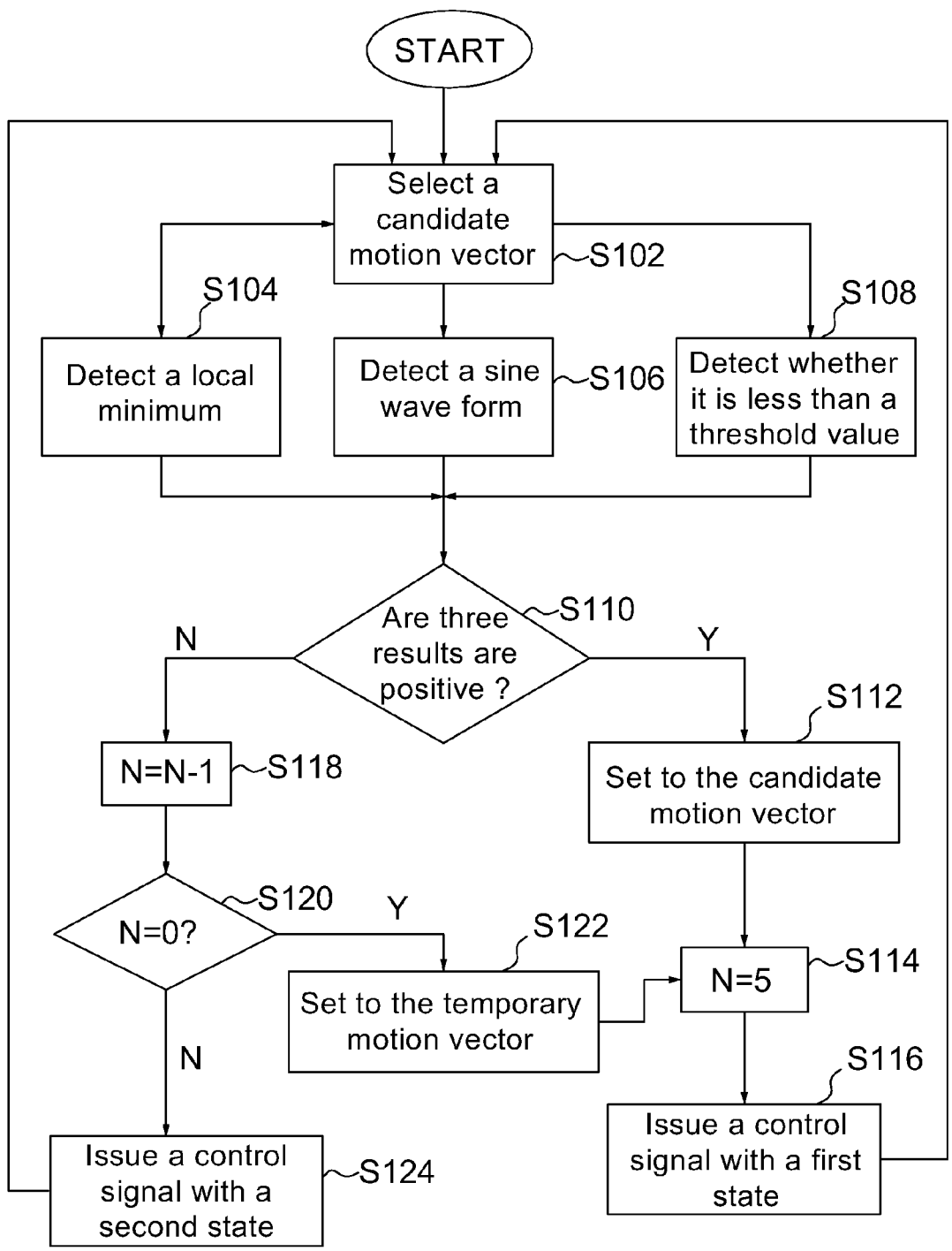
FIG. 10 is a flow chart showing a motion vector calibration method according to an embodiment of the invention.

FIG. 10 is a flow chart showing a motion vector calibration method according to an embodiment of the invention. According to an embodiment of the invention, an motion vector calibration method is used to receive both the temporary motion vector $TMV_i$ and the corresponding SAD map of a target block $B_i$ of the current frame F1 to generate the calibrated motion vector $MMV_i$ of the target block B. Referring to both FIG. 3 and FIG. 10, the motion vector calibration method is detailed as follows.

Step S102: Select a candidate motion vector CMV according to coordinates of the target block $B_i$. In this embodiment, the calibrated motion vectors of the neighboring four blocks (as shown in FIG. 4A) of the target block $B_i$ and the global motion vector GMV are selected to sequentially serve as the candidate motion vector CMV of the target block B.

Step S104: Detect whether the corresponding SAD value of the candidate motion vector CMV is a local minimum according to the candidate motion vector CMV, the SAD map and a preset vector.

Step S106: Select at least three sampled motion vectors to detect whether the corresponding SAD values of the sampled motion vectors form a sine wave.

Step S108: Detect whether the corresponding SAD value of the candidate motion vector CMV is less than a threshold value.

Step S110: Determine whether the detecting results of the step S104, S106 and S108 are all positive. Three positive detecting results mean the candidate motion vector CMV passes periodic pattern detection, and then the flow goes to Step S112. If any one of the detecting results of the step S906, S908 and S910 is negative, it means the candidate motion vector CMV fails in periodic pattern detection, and then the flow goes to step S118.

Step S112: If the above-mentioned checking results are all positive, the calibrated motion vector $MMV_i$ of the target block $B_i$ is set to the candidate motion vector CMV.

Step S114: Set a count value N to five. The count value N is reset to five.

Step S116: Issue a control signal S with a first state. The decision circuit 350 issues a control signal S with a first state to inform the select circuit 310 to select a candidate motion vector for the next target block ($B_{i+1}$). Then, the flow returns to step S102.

Step S118: N=N−1. The count value N is decreased by one, meaning the current candidate motion vector CMV fails in periodic pattern detection.

Step S120: Determine whether the count value N is equal to 0. If "YES", it means the calibrated motion vectors of the neighboring four blocks of the target block $B_i$ and the global motion vector GMV all fail in periodic pattern detection, and the flow goes to step 122; otherwise, the flow goes to step S124.

Step S122: Set the calibrated motion vector $MMV_i$ of the target block $B_i$ to the temporary motion vector $TMV_i$. Then, the flow returns to step S114.

Step S124: Issue the control signal S with a second state. The decision circuit 350 issues a control signal S with a second state to inform the select circuit 310 to select the next candidate motion vector (which is one of the calibrated motion vectors of the neighboring four blocks of the target block $B_i$ and the global motion vector GMV) for the target block B. Then, the flow returns to step S102.

Figure 4B:
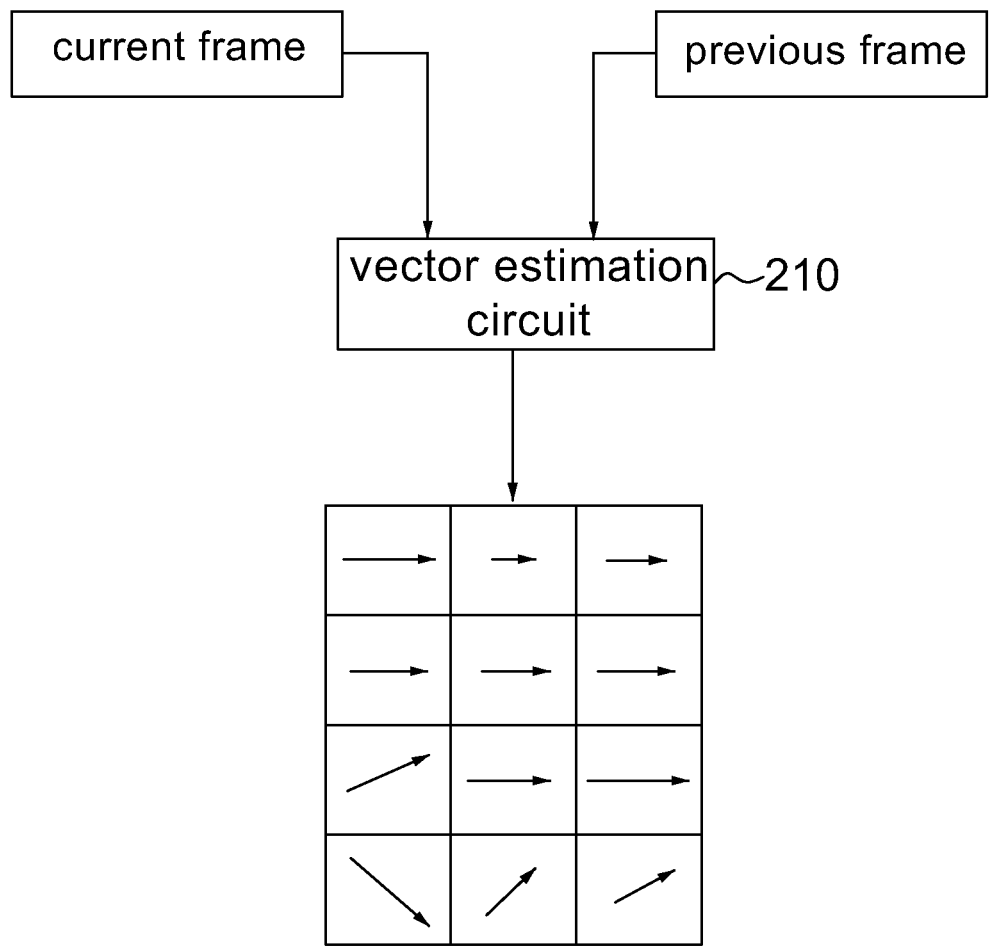
FIG. 4B is an example showing motion vectors that a vector estimation circuit obtains according to a current frame and a previous frame.

In the above-mentioned embodiments, each of the vector estimation circuit 210 of FIG. 2 and step S902 of FIG. 9 operates using forward search. Forward search uses BME algorithm to search the previous frame F0. According to forward search, the current frame F1 is firstly divided into several blocks and one of them serves as a target block. Following this, a corresponding position of the target block is searched in the previous frame F0, and the motion vector with the minimum SAD value is called the temporary motion vector. It should be understood, however, that the vector estimation circuit 210 of the invention is not limited to any specific implementation method as long as it can obtain the motion vectors of the corresponding blocks between the current frame F1 and the previous frame F0 (as shown in FIG. 4B). Besides, the search method that the vector estimation circuit 210 can perform is not limited to forward search described above, but fully extensible to any existing or yet-to-be developed search methods. The well known search methods that the vector estimation circuit 210 can perform include forward search, backward search, bi-direction search, hierarchical search, etc.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A motion vector calibration circuit for receiving a temporary motion vector of a target block of an image and a plurality of motion estimation errors of the target block and generating a calibrated motion vector of the target block, comprising:

a select circuit for selecting a candidate motion vector from at least one calibrated motion vector of at least one neighboring block of the target block and a global motion vector of the image according to coordinates of the target block;

a first detection circuit for detecting whether the motion estimation error corresponding to the candidate motion vector is a local minimum among the plurality of motion estimation errors according to the candidate motion vector, the plurality of motion estimation errors and a preset vector;

a second detection circuit for selecting at least three sampled motion vectors to detect whether the motion estimation errors corresponding to the at least three sampled motion vectors form a sine wave according to the candidate motion vector and the temporary motion vector;

a third detection circuit for detecting whether the motion estimation error corresponding to the candidate motion vector is less than a threshold value according to the candidate motion vector; and a decision circuit for outputting the candidate motion vector as the calibrated motion vector if detecting results of the first detection circuit, the second detection circuit and the third detection circuit are positive.

2. The circuit according to claim 1, wherein the select circuit selects a plurality of motion vectors from the at least one calibrated motion vector of the at least one neighboring block and the global motion vector of the image to sequentially serve as the candidate motion vector.

3. The circuit according to claim 2, wherein if all of the plurality of motion vectors that sequentially serve as the candidate motion vector fail in detections performed by the first detection circuit, the second detection circuit and the third detection circuit, the decision circuit outputs the temporary motion vector as the calibrated motion vector.

4. The circuit according to claim 1, wherein if the candidate motion vector fails in any one of detections performed by the first detection circuit, the second detection circuit and the third detection circuit, the decision circuit outputs the temporary motion vector as the calibrated motion vector.

5. The circuit according to claim 1, wherein the motion estimation error is selected from the group comprising a sum of absolute difference (SAD), a mean absolute difference (MAD) and a mean square error (MSE).

6. The circuit according to claim 1, further comprising: a buffer coupled to the decision circuit for temporarily storing the calibrated motion vectors of the image.

7. The circuit according to claim 6, wherein the select circuit is coupled to the buffer and retrieves the at least one calibrated motion vector of the at least one neighboring block from the buffer according to the coordinates of the target block.

8. An image generating apparatus for receiving a first image and a second image to generate at least one interpolated image, comprising:
 a vector estimation circuit for performing vector estimation and generating both a temporary motion vector and a plurality of motion estimation errors of a target block according to the target block of the first image and a preset search area established in the second image, wherein the first image and the second image are respectively divided into the same number of blocks and the temporary motion vector has the minimum motion estimation error;
 a motion vector calibration circuit for receiving both the temporary motion vector and the plurality of motion estimation errors of the target block and generating a calibrated motion vector of the target block, comprising:
 a select circuit for selecting a candidate motion vector from at least one calibrated motion vector of at least one neighboring block of the target block and a global motion vector of the first image according to coordinates of the target block;
 a first detection circuit for detecting whether the motion estimation error corresponding to the candidate motion vector is a local minimum among the plurality of motion estimation errors according to the candidate motion vector, the plurality of motion estimation errors and a preset vector;
 a second detection circuit for selecting at least three sampled motion vectors to detect whether the motion estimation errors corresponding to the at least three sampled motion vectors form a sine wave according to the candidate motion vector and the temporary motion vector;
 a third detection circuit for detecting whether the motion estimation error corresponding to the candidate motion vector is less than a threshold value according to the candidate motion vector; and
 a decision circuit for outputting the candidate motion vector as the calibrated motion vector if detecting results of the first detection circuit, the second detection circuit and the third detection circuit are positive; and
 a motion compensated interpolation circuit for performing image interpolation to generate the at least one interpolated image according to all the calibrated motion vectors of the first image, the first image and the second image.

9. The apparatus according to claim 8, wherein the select circuit selects a plurality of motion vectors from the at least one calibrated motion vector of the at least one neighboring block and the global motion vector of the first image to sequentially serve as the candidate motion vector, and wherein if all the plurality of motion vectors that sequentially serve as the candidate motion vector fail in detections performed by the first detection circuit, the second detection circuit and the third detection circuit, the decision circuit outputs the temporary motion vector as the calibrated motion vector.

10. The apparatus according to claim 8, wherein if the candidate motion vector fails in any one of detections performed by the first detection circuit, the second detection circuit and the third detection circuit, the decision circuit outputs the temporary motion vector as the calibrated motion vector.

11. The apparatus according to claim 8, further comprising:
 a buffer coupled to the decision circuit for temporarily store the calibrated motion vectors of the first image.

12. The apparatus according to claim 11, wherein the select circuit is coupled to the buffer and retrieves the at least one calibrated motion vector of the at least one neighboring block from the buffer according to the coordinates of the target block.

13. A motion vector calibration method for receiving a temporary motion vector of a target block of an image and a plurality of motion estimation errors of the target block and generating a calibrated motion vector of the target block, comprising:
 selecting a candidate motion vector from at least one calibrated motion vector of at least one neighboring block of the target block and a global motion vector of the image according to coordinates of the target block;
 detecting whether the motion estimation error corresponding to the candidate motion vector is a local minimum among the plurality of motion estimation errors according to the candidate motion vector, the plurality of motion estimation errors and a preset vector to produce a first detecting result;
 selecting at least three sampled motion vectors to detect whether the motion estimation errors corresponding to the at least three sampled motion vectors form a sine wave according to the candidate motion vector and the temporary motion vector to produce a second detecting result;
 detecting whether the motion estimation error corresponding to the candidate motion vector is less than a threshold value according to the candidate motion vector to produce a third detecting result; and
 setting the calibrated motion vector to the candidate motion vector if the first, second and third detecting results are positive.

14. The method according to claim 13, wherein the step of selecting the candidate motion vector comprises:
 selecting a plurality of motion vectors from the at least one calibrated motion vector of the at least one neighboring block and the global motion vector of the image to sequentially serve as the candidate motion vector.

15. The method according to claim 14, further comprising:
 setting the calibrated motion vector to the temporary motion vector if all the plurality of motion vectors that sequentially serve as the candidate motion vector fail according to the first, second and third detecting results.

16. The method according to claim 13, further comprising:
setting the calibrated motion vector to the temporary motion vector if one of the first, second and third detecting results is negative.

17. The method according to claim 13, wherein the motion estimation error is selected from the group comprising a sum of absolute difference (SAD), a mean absolute difference (MAD) and a mean square error (MSE).

18. An image generating method for receiving a first image and a second image to generate at least one interpolated image, comprising:
performing vector estimation to generate both a temporary motion vector and a plurality of motion estimation errors of a target block according to the target block of the first image and a preset search area established in the second image, wherein the first image and the second image are respectively divided into the same number of blocks and the temporary motion vector has the minimum motion estimation error;
selecting a candidate motion vector from at least one calibrated motion vector of at least one neighboring block of the target block and a global motion vector of the first image according to coordinates of the target block;
detecting whether the motion estimation error corresponding to the candidate motion vector is a local minimum among the plurality of motion estimation errors according to the candidate motion vector, the plurality of motion estimation errors and a preset vector to produce a first detecting result;
selecting at least three sampled motion vectors to detect whether the motion estimation errors corresponding to the at least three sampled motion vectors form a sine wave according to the candidate motion vector and the temporary motion vector to produce a second detecting result;
detecting whether the motion estimation error corresponding to the candidate motion vector is less than a threshold value according to the candidate motion vector to produce a third detecting result;
setting the calibrated motion vector to the candidate motion vector if the first, second and third detecting results are positive; and
performing image interpolation to generate the at least one interpolated image according to all the calibrated motion vectors of the first image, the first image and the second image.

19. The method according to claim 18, wherein the step of selecting the candidate motion vector comprises:
selecting a plurality of motion vectors from the at least one calibrated motion vector of the at least one neighboring block and the global motion vector of the first image to sequentially serve as the candidate motion vector.

20. The method according to claim 19, further comprising:
setting the calibrated motion vector to the temporary motion vector if all the plurality of motion vectors that sequentially serve as the candidate motion vector fail according to the first, second and third detecting results.

21. The method according to claim 18, further comprising:
setting the calibrated motion vector to the temporary motion vector if one of the first, second and third detecting results is negative.

* * * * *